United States Patent [19]

Kondratenko et al.

[11] 4,048,339
[45] Sept. 13, 1977

[54] PREPARATION OF CHEESE WITH A MICROBIAL MILK COAGULATING ENZYME

[75] Inventors: Maria Stefanova Kondratenko; Lyubomir Todorov Nachev; Petrushka Atanassova Dedova; Tamara Nikolaevna Antonova, all of Sofia, Bulgaria

[73] Assignee: DSO "Mlechna Promishlenost", Sofia, Bulgaria

[21] Appl. No.: 633,697

[22] Filed: Nov. 20, 1975

[30] Foreign Application Priority Data

Nov. 22, 1974 Bulgaria .................................. 28256

[51] Int. Cl.$^2$ .......................... A23C 19/00; C07G 7/02
[52] U.S. Cl. ........................................ 426/39; 195/62; 195/66 R; 426/36; 426/40; 426/63
[58] Field of Search ....................... 426/36, 39, 40, 42, 426/43, 63; 195/62, 66 R

[56] References Cited

FOREIGN PATENT DOCUMENTS 724,095  12/1965  Canada
565,788  11/1944  United Kingdom

*Primary Examiner*—David M. Naff
*Attorney, Agent, or Firm*—Armstrong, Nikaido & Marmelstein

[57] ABSTRACT

Soft and hard types of cheese are prepared from cow milk by a method of using a milk coagulating enzyme from *Bacillus substilis mesentericus*. The method involves increasing milk acidity before pasteurization to from 0.189 to 0.216% lactic acid, adding an amount of calcium chloride subsequent to pasteurization 2 to 4 fold over that employed in the prior art and adding a sufficient amount of milk coagulating enzyme to cause coagulation within 25 to 40 minutes. Soft and hard cheese prepared by this process have a taste and consistency equivalent to that of soft and hard cheese prepared with rennet from calf stomachs.

1 Claim, No Drawings

PREPARATION OF CHEESE WITH A MICROBIAL MILK COAGULATING ENZYME

The present invention is concerned with a method for the application of milkcoagulating enzyme obtained from strains of *Bacillus subtilis mesentericus* group in the production of soft and hard types of cow milk cheese.

The present invention is particularly concerned with alterations of some technological parameters for securing adequate conditions for the successful application of milk-coagulating enzyme obtained from strains of the *Bacillus subtilis mesentericus* group in the production of soft and hard types of cow milk cheese having taste and consistency equivalent to those of the same type of cheese prepared with rennet from calf stomachs (vells).

Soft and hard types of cheese obtained with rennet from calf stomachs are produced using different technologies but the below listed procedures are common for both types. These are:

mechanical cleaing of milk supply cooling of milk to $+6°-+10°C$ storage of milk testing of milk for antibiotics or inhibitory substances and acidity. The milk should not contain any antibiotics or inhibitory substances and should have an acidity not above 20° T.

pasteurization of milk at 72° C with no holding time or with holding time of about 15 to 20 minutes depending on the type of cheese cooling of milk to $+28°-+33°$ C, i.e., to the renneting temperature, depending on the type of cheese addition of 0.1–1% (depending o the type of cheese) multi strain starter comprising lactic acid microorganisms to milk addition of 25 to 30 ml 50% calcium chloride solution to milk addition of 25 to 30 ml liquid rennet to 100 liter milk (the above quantity of liquid rennet produces coagulation in 10-12 minutes; the process is then continued from 60 to 90 minutes depending on the type of cheese)

processing of cheese curd of soft and hard types of cheese is different for each type pressing of cheese curd; moulding, salting, packing, ripening and storing of cheese.

By strictly observing the above procedures and parameters, liquid rennet from calf stomachs yields soft and hard types of cheese having each specific taste, aroma, consistency, and yield. Ripening follows a normal course and miximum storage time is up to 1 year.

All over the world scientists have investigated the use of substitutes for calf stomachs as the latter became less available every day. The most frequently used substitutes are either moulds or substances of bacterial origin. At present, all substitutes are used without any alternations of the above listed procedures and parameters. The preparations "Renelase" and (Denmark), "Fromase" (France), obtained from *Nucor mihei* mould, "Meito"(Japan), obtained from *Nucor pusillus* bindt, "SureCurde" (USA) — from *Endothia parasitica* mould, "Milkosin" (Japan) — from *Bacillus polymixa* and a preparation obtained from *Bacillus subtilis* (Switzerland and DDR) are used in the production of soft and hard types of cow milk cheese without altering the above procedures and parameters which affect the quality of renneting, the rate of wheying off, and the consistency and taste of the ripe cheese. The preparations "MIlkosim" and the preparation obtained from *Bacillus subtilis* cannot be used independently in the production of soft and hard types of cheese. Most of the authors investigating the use of microbial substitutes have found that mould preparations take part in the ripening of cheese. During ripening (5th-6th month), the consistency of the cheese and particularly that of the hard type as well as the taste of the cheese undergo changes which lead to pastelike consistency and bitter taste.

With decreasing of pH below 5.0, all mould preparations increase their coagulation and proteolytic activities which are highest at pH 2.0. In contrast to this behaviour, the enzyme preparation obtained from strains of *Bacillus subtilis mesentericus* group doesn't participate in this process.

An object of the present invention is the use of milk-coagulating enzyme obtained from strains of *Bacillus subtilis mesentericus* group for preparing of soft and hard types of cheese having consistency and taste as well as ripening and storage ability equivalent to those of soft and hard types of cheese prepared with liquid rennet from calf stomachs.

The aim of the present proposal is altering three of the above indicated parameters, namely:

acidity of milk before pasteurization, coagulation time (quantity of enzyme), quantity of 50% calcium chloride solution added.

The lactic acid solution increases milk acidity to 21-24° T (0.189 –0.216%). The quantity of enzyme preparation added should cause milk coagulation in 25 to 40 minutes. The quantity of 50% calcium chloride solution in 100 liters milk is increased 2 to 4 fold over that normally added.

By using the milk coagulating enzyme obtained from strains of the *Bacillus subtilis mesentericus* group, alternations of the technological parameters indicated above offer the following advantages:

obtaining the rennet coagulum equivalent to that obtained with liquid rennet processing of cheese curd equivalent to that of cheese prepared with liquid rennet obtaining of soft and hard types of cheese following a normal course of ripening and having long shelf-life obtaining of soft and hard types of cheese whose consistency and taste remain constant during ripening obtaining of soft and hard types of cow milk cheese having specific for the respective type consistency, taste, and aroma equivalent to those of soft and hard types of cheese prepared with liquid rennet.

An example for the preparation of cheese according to the present invention with milk-coagulating enzyme is as follows.

Before processing the cow milk is mechanically cleaned through filters or by centrifugation; it is then cooled to $+6°$ to $+10°$ C and stored overnight. During storage the milk is tested for antibiotics, inhibitory substances and acidity. Before pasteurization the acidity of the milk is adjusted to 21°-24° T using lactic acid solution (first altered parameter). After pasteurization at 72° C the milk is cooled to 32 -35° C. Lactic acid microorganism starter is added to the milk in quantities of 0.1–1% depending on the type of cheese. After thorough stirring 80-160 ml of 50% calcium chloride solution is diluted in water at a ratio 1:1 and added to 100 liters milk (second altered parameter). After stirring a small quantity of the mixture milk-starter — calcium chloride enzyme preparation dissolved in water at a ratio 1:2 (enzyme: water) is added to it. The determined quantity must secure coagulation in 25 to 40 minutes after adding of the preparation (third altered parameter). Processing of cheese curd (i.e., cutting, forming the grains and heating) pressing, moulding, ripening, and storage of cheese were carried out as described above for the soft and hard types of cheese prepared with liquid rennet from calf stomachs.

We claim:

1. In a process for preparing hard and soft cheese from cow milk comprising the steps of:
   1. mechanically cleaning of supply of cow milk;
   2. cooling said milk;
   3. pasteurizing the milk;
   4. again cooling the milk;
   5. adding a starter comprising lactic acid microorganisms to the milk;
   6. adding the equivalent of 0.025 to 0.030% by volume based on the milk a solution of 50% calcium chloride to the milk;
   7. adding liquid rennet to the milk to produce coagulation;
   8. and processing the cheese product; the improvement which comprises:
      1. increasing the acidity of the milk before pasteurization to about 21°–24° T (0.189 to 0.216%) lactic acid;
      2. increasiing the said equivalent amount of calcium chloride described in step 6 added to the milk by 2 to 4 fold;
      3. adding sufficient of the enzyme obtained from *Bacillus subtilis mesentericus* to produce coagulation within 25–40 minutes.

* * * * *